United States Patent [19]

Abbiate et al.

[11] Patent Number: 4,941,151

[45] Date of Patent: Jul. 10, 1990

[54] PREDICTIVE CLOCK RECOVERY CIRCUIT

[75] Inventors: Jean-Claude Abbiate, LaGaude; Alain Blanc, Vence; Patrick Jeanniot; Eric Lallemand, both of LaGaude, all of France

[73] Assignee: Internationl Business Corporation, Armonk, N.Y.

[21] Appl. No.: 252,303

[22] Filed: Oct. 3, 1988

[30] Foreign Application Priority Data

Oct. 19, 1987 [EP] European Pat. Off. ........... 87480014

[51] Int. Cl.$^5$ ............................................. H04L 7/033
[52] U.S. Cl. ....................................... 375/20; 375/110; 328/130.1
[58] Field of Search ................... 375/20, 95, 110, 120; 331/1 A, 1 R; 328/129.1, 130.1, 155; 307/601

[56] References Cited

U.S. PATENT DOCUMENTS

| | | | |
|---|---|---|---|
| 3,633,108 | 1/1972 | Kneuer | 375/110 |
| 4,029,905 | 6/1977 | Abraham | 375/110 |
| 4,267,595 | 5/1981 | Hernandez | 375/95 |
| 4,423,518 | 12/1983 | Hirosaki | 375/20 |
| 4,599,735 | 7/1986 | Surie et al. | 375/95 |
| 4,799,239 | 1/1989 | Pearlman et al. | 375/95 |

FOREIGN PATENT DOCUMENTS 0228021 7/1987 European Pat. Off. .
179630 8/1986 Japan .
85-04775 10/1985 World Int. Prop. O. .

Primary Examiner—Benedict V. Safourek
Attorney, Agent, or Firm—Joscelyn G. Cockburn

[57] ABSTRACT

A predictive clock extracting circuit having a first circuit for determining the duration between two consecutive transitions of a multilevel digital signal and a second circuit for generating an SPL pulse at half the duration after a third transition following on two consecutive previous transitions. A phase locked oscillator which is driven by said SPL pulse generates the extracted clock signal which is in phase with the SPL pulse and coincides with the center of the eye intervals of said multilevel digital signal. The system includes a first counter N which starts running in response to the detection of the first transition of the multilevel digital signal. The running stops when the second transition occurs. The result N(i) stored into the first counter N at second transition is therefore representative of the duration between the two consecutive first and second transitions. The preferred embodiment of the invention also involves an up/down counter K which generates a second counter K(i) that is expected to be representative of half the value of the first counter N(i). Counter K is adaptively updated by incrementing its current value K(i) by a fixed factor or, on the contrary, by decrementing its current value K(i) by a fixed damping factor.

13 Claims, 16 Drawing Sheets

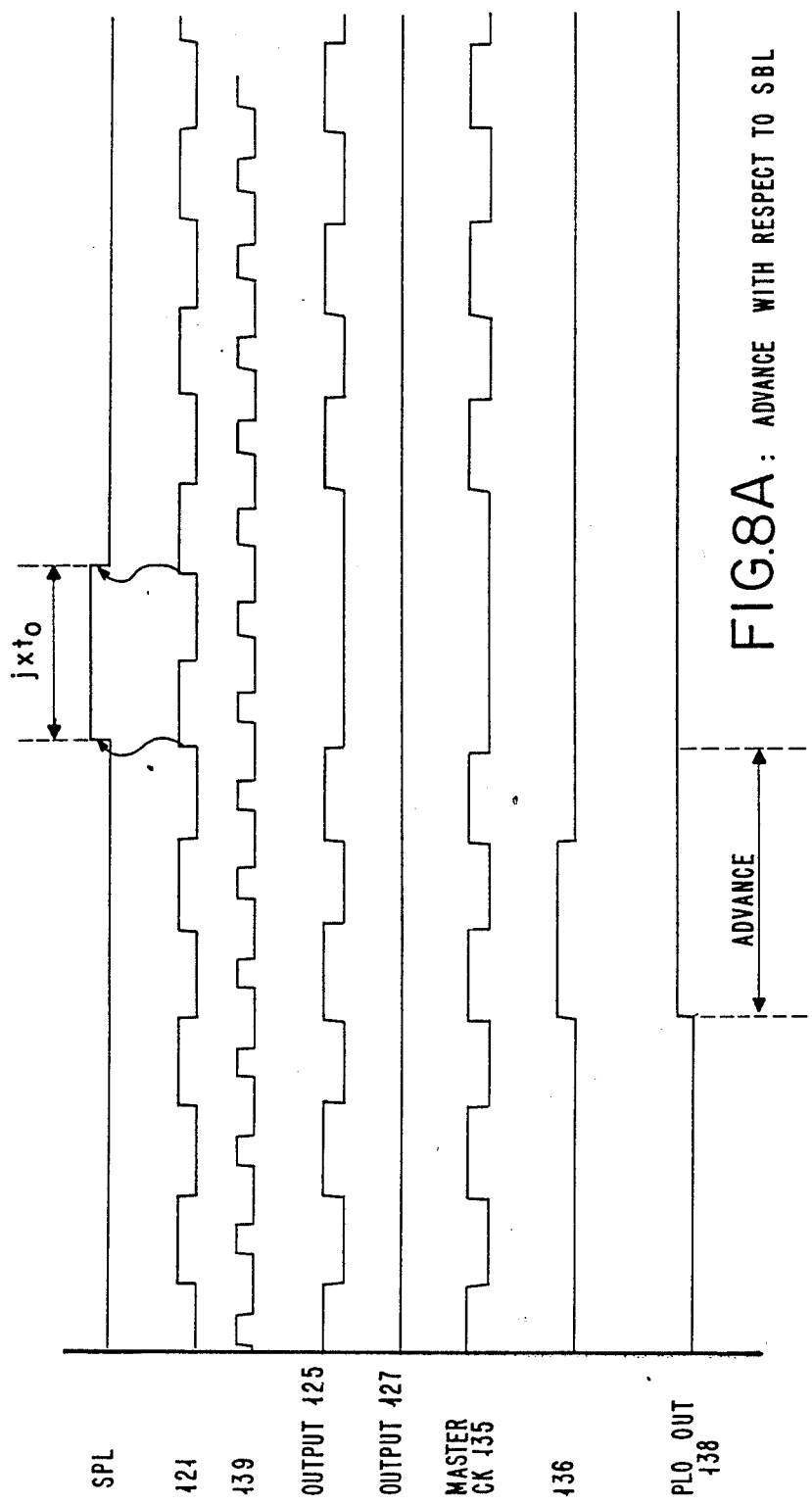

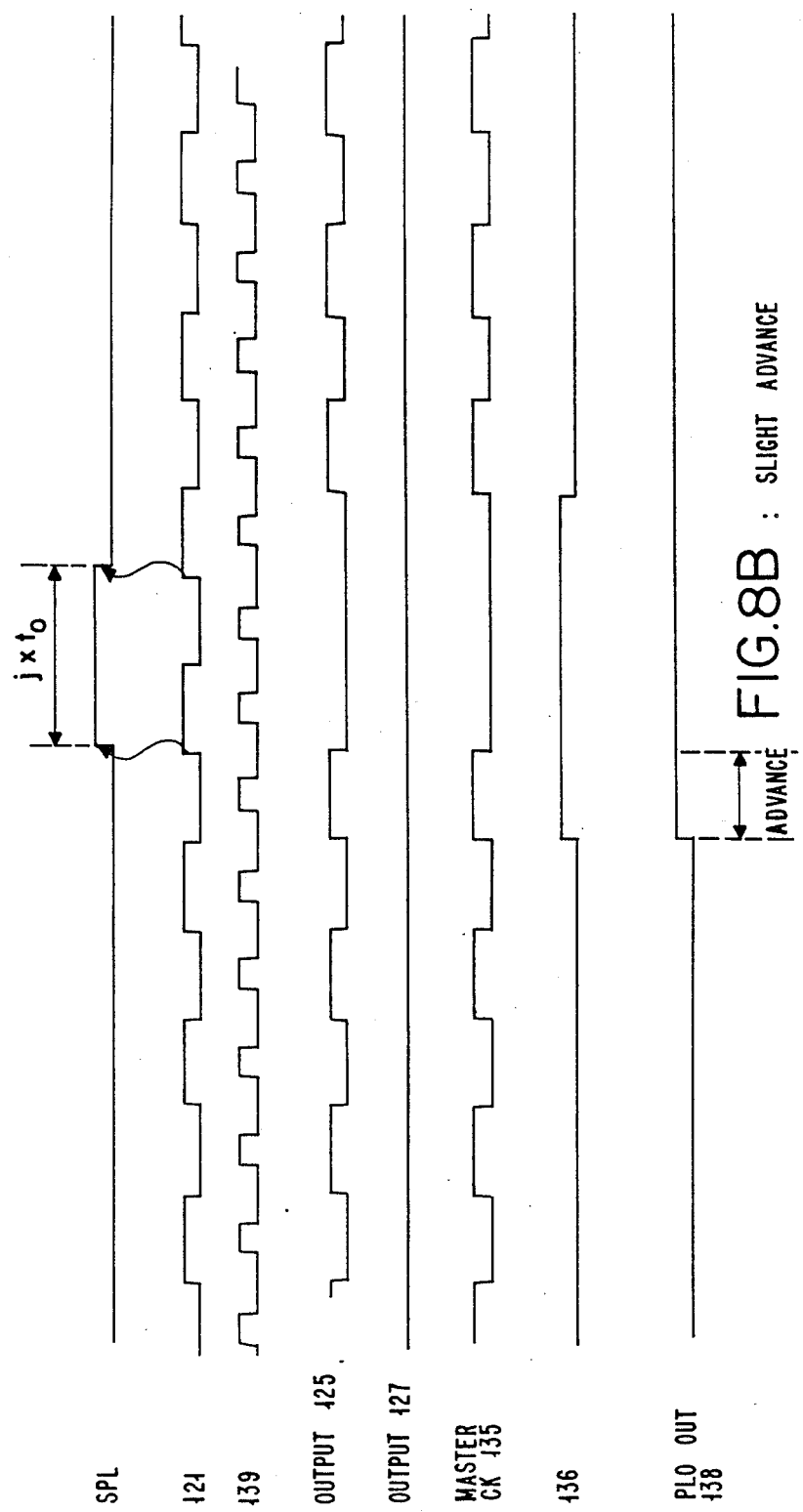

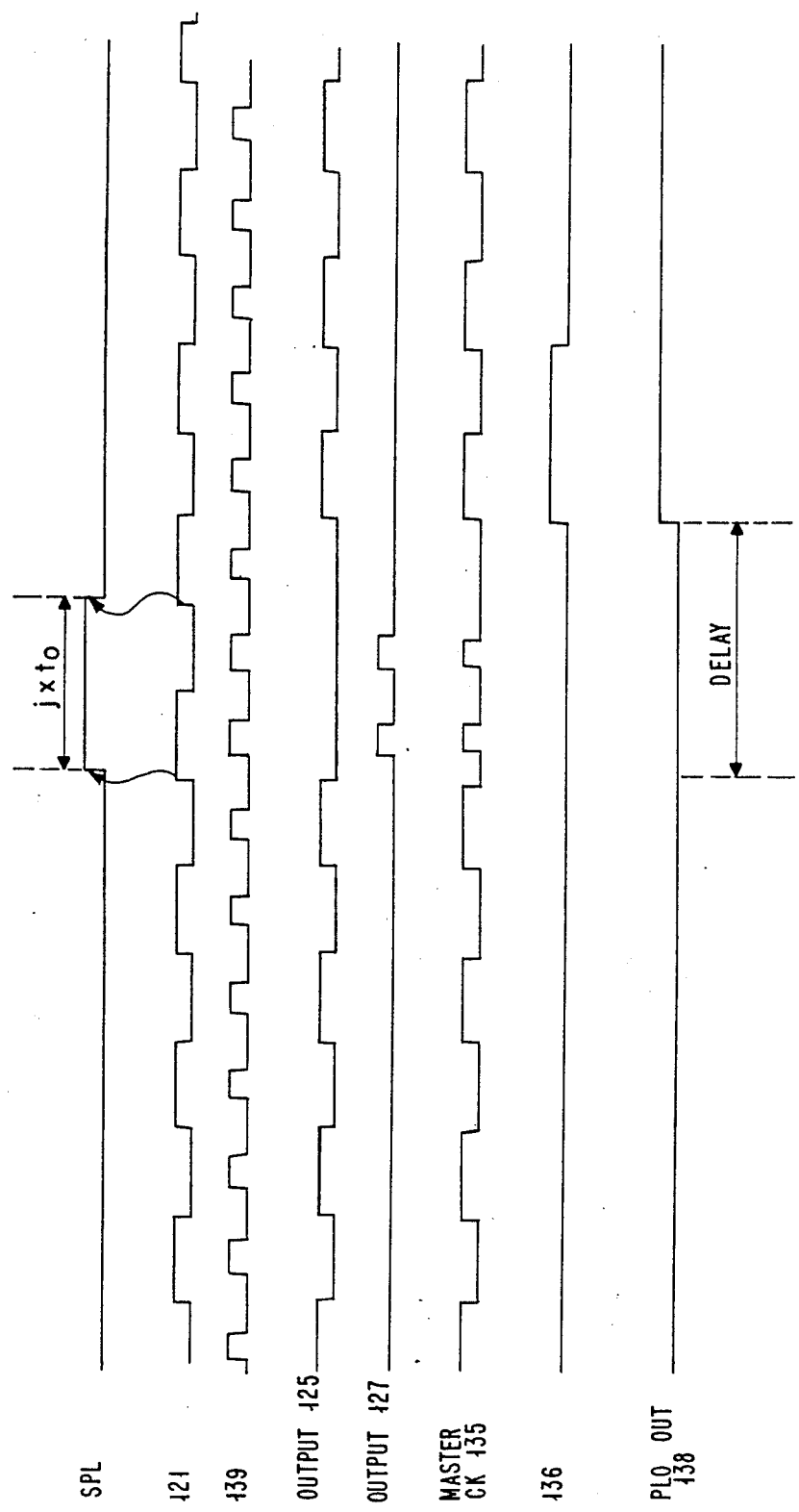

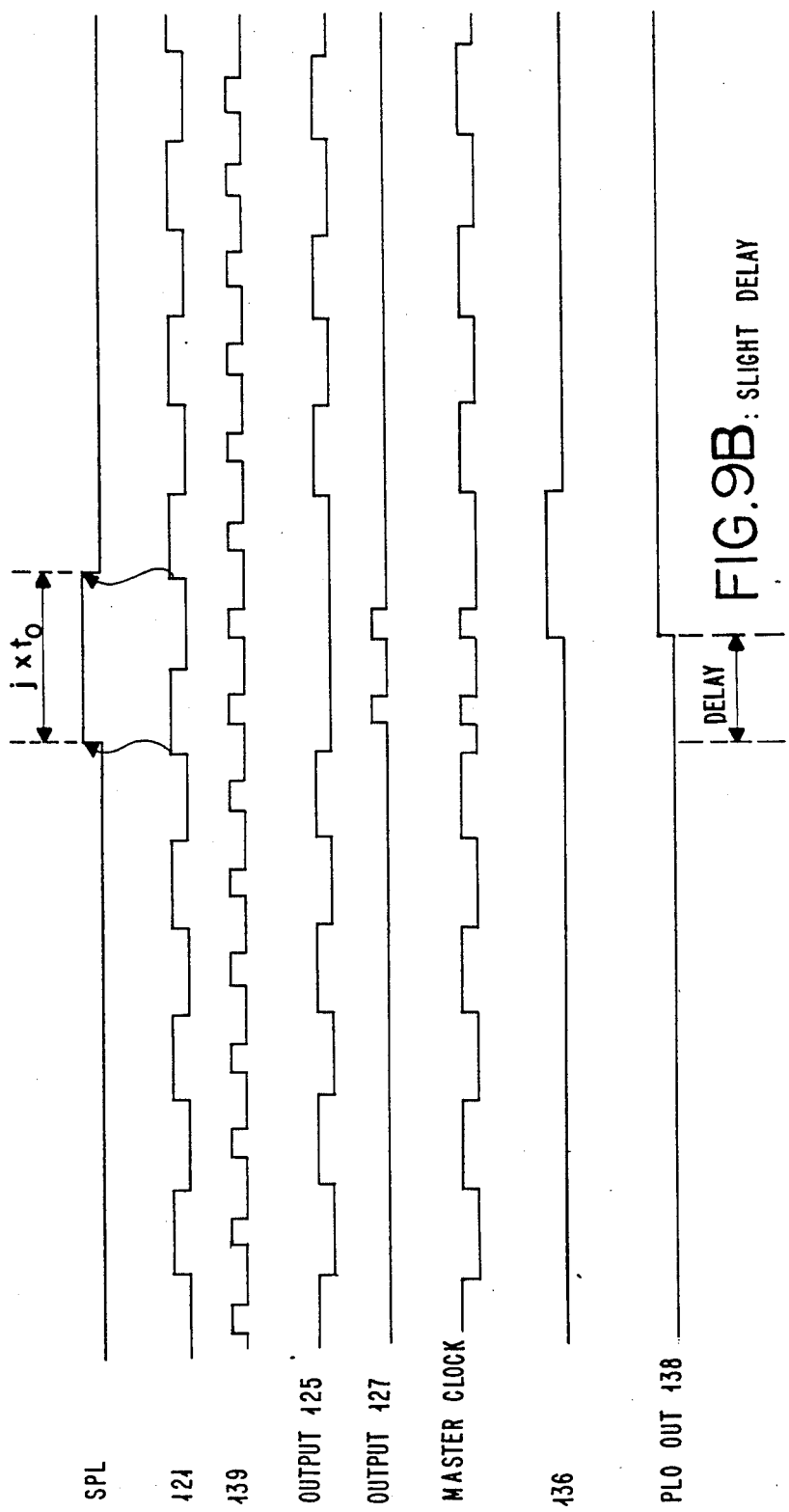

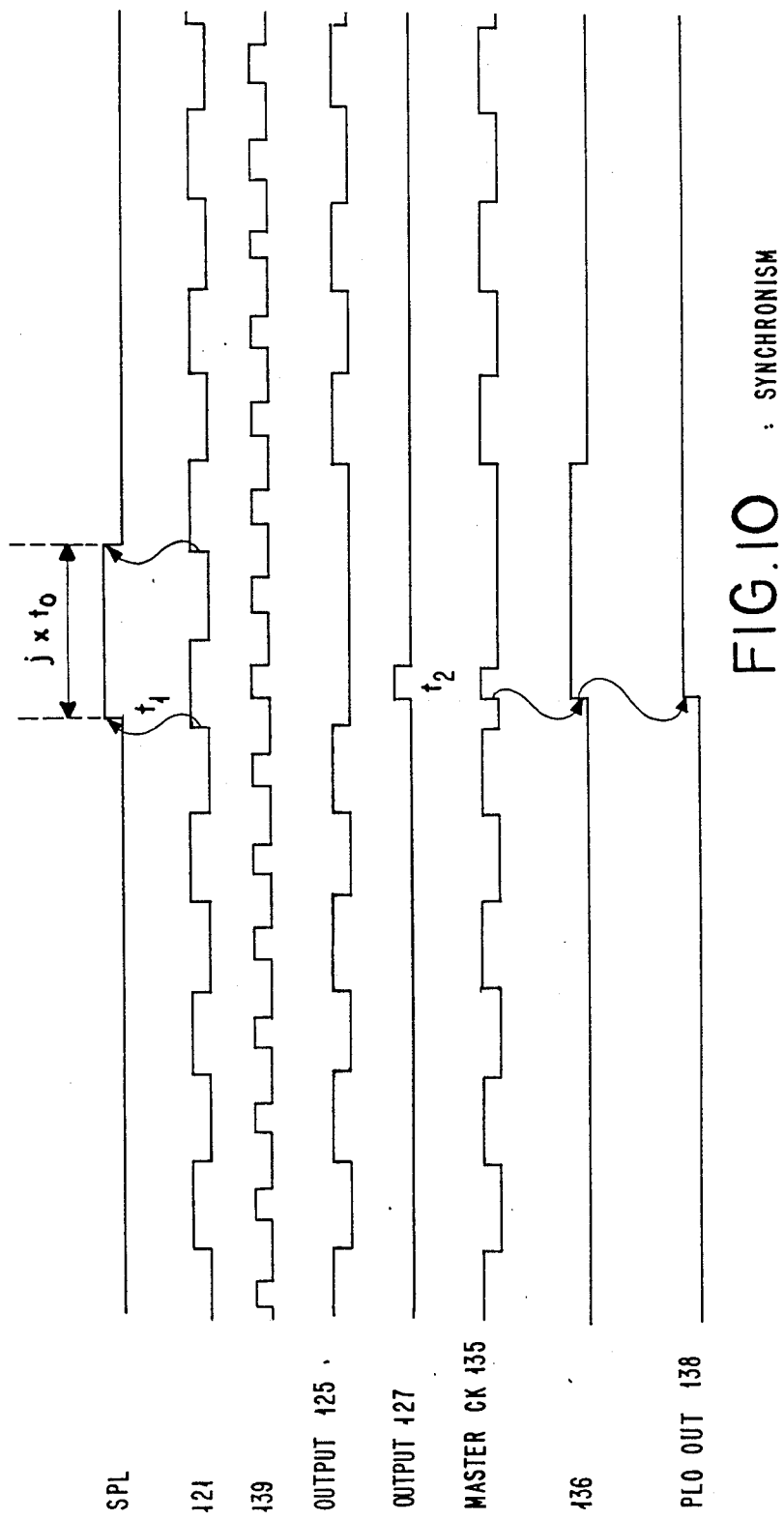
FIG. 10 : SYNCHRONISM

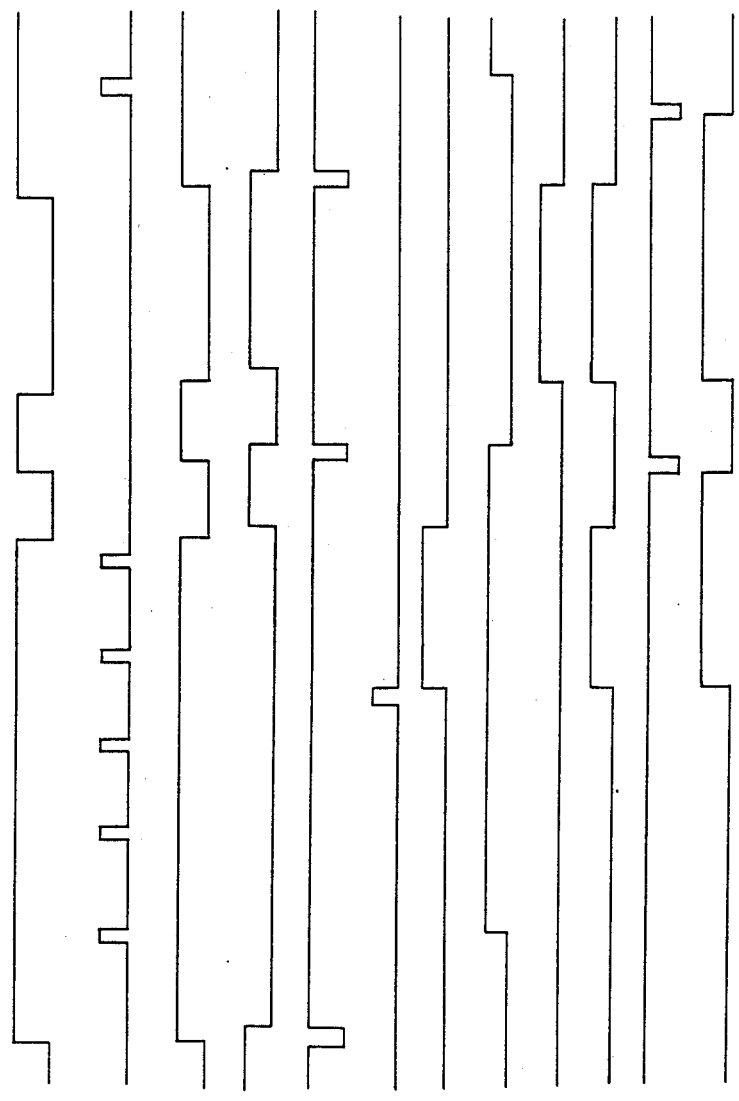

PREDICTIVE CLOCK RECOVERY CIRCUIT

BACKGROUND OF THE INVENTION

1. Field of the Invention

This invention relates generally to data transmission systems and, particularly, to a predictive clock recovery circuit having adaptive sampling determination means.

2. Description of the Prior Art

A data-communication system usually consists of three basic blocks: the transmitter, the channel, and the receiver. The transmitter has the task of assigning an electricical waveform to each possible sequence of digits received, at its input, from the data source. The electrical waveform is passed through the channel, and is invariably corrupted by unwanted, randoms signals known as noise. Because of these random signals, the received waveform does not correspond exactly to any of the possible transmitted waveforms. Nevertheless, the receiver must make a decision as to which of the data sequences is most likely to have given rise to the particular received waveform.

Particularly, the distribution of noise and intersymbol interference may readily be seen by using an oscilloscope to sweep out the received voltage corresponding to a baseband pulse transmission. The resulting oscilloscope display is widely known as an "eye pattern" from its resemblance to the human eye for binary data. To understand and interpret eye patterns, examine FIG. 1A and FIG. 1B where two bipolar waveforms are shown, one undistorted and the other distorted. In the undistorted waveform of FIG. 1A, a vertical line drawn through the center of the eye pattern shows a superposition of all received sampled values. When this sampling time is properly adjusted in FIG. 1A, all the sampled values are either +1, 0 or −1. In FIG. 1B, the waveform is distorted because of the effects of intersymbol interference and noise. Now, the signal received x(t) no longer passes through the proper values +1, −1 and 0 at each sampling point. The distorsion is clearly seen in the eye pattern for this waveform; the eye is now partially closed and detection is obviously more difficult. it should be noticed that the best sampling time must occur where the eye is open widest, that is to say in the middle of the eye pattern. Many receivers derive timing information by averaging zero crossings of the signal. The timing is adjusted to be halfway between crossing position. FIG. 1C illustrates such a conventional receiver: The analog signal x(t) received after the equalization process is transmitted to a peak detector 10 which determines the value Vp of the maximum amplitude of x(t). Then divide by 2 circuit 11 divides Vp by a given ratio, for instance 2. Comparator 12 receiving both signals x(t) and Vp has its output having a high level when x(t) is superior to Vp and conversely, a low level when x(t) is inferior to Vp. The signal at the output of comparator 12 is called the analog squared wave signal ASD. It is used to drive a phase locked oscillator PLO 13 which, by means of a internal clock of, generates a recovered clock in phase with ASD signal. The sampling timing is derived from the recovered clock by means of a delay circuit 14 which is adjusted to position approximately the timing in the "middle" of the eye opening.

In highly sophisticated receivers having powerful signal processing and egualization capabilities, the intersymbol interference is reduced to a minimum value and the eye pattern is very close to that of FIG. 1A. Consequently, in such systems, the clock recovery circuit described with respect to FIG. 1C is quite enough to allow good determination of the digit sequence. However, such systems must include signal processing means to allow an adaptive equalization of the transmission channel since the transmission characteristics may change to a large extent, particularly on telephone lines. When transmitting data at high speeds such as 56 kb/s, the signal processor must be particularly powerfull to allow an effective automatic equalization. For instance, a sophisticated equalization of a 56 kb/s communication channel requires a least a 14 Mips signal processor (millions of instructions per second). It is obviously noticed that the implementation of such means might increase considerably the overall cost of the receiver, particularly in low-cost bandbase equipments.

However, in such low cost equipments, such as a bandbase receiver, having no highly sophisticated equalization means, the eye pattern is rather closer to the eye of FIG. 1B than that of FIG. 1A, and particularly at high speeds. In such a system, it is much more fundamental to instruct sampling circuitry at optimal times, that is to say at the "middle" of the eye, whatever its distorsion is.

U.S. Pat. No. 4,339,823 describes an apparatus for generating a recovered clock signal having pulses with a selected transitory edge timed to occur at the center of the eye intervals of a multilevel digital signal. The system describes in that patent application includes a transition marker generating means, for generating a transition marker signal each time the received signal crosses any of a plurality of predetermined threshold levels. The transition marker generating means produces a plurality of transition marker signal groups, each transition marker signal group being followed in time by a eye interval. To assure that the sampling time will occur at the "middle of the eye", this system uses a particular phase error detection circuit 400 (column 10, line 45 and following). This circuit 400 is designed for counting the number of transition markers occurring during the high portion of each cycle of the recovered clock signal and the number of transition markers occurring during the low portion of each cycle of the recovered clock signal. Additional circuitry is used to generate a phase error signal when these quantities are not equal. However, this system involves complex design and analog circuitry for generating a sinusoidal signal, that will be difficult to integrate in a simple chip.

U.S. Pat. No. 4,295,222 describes an arrangement for restituting the clock and for sampling the demodulated signals formed by demodulation of the received signal by means of the signals which are in phase with and shifted through 90° relative to a local carrier. This system comprises logic circuit to detect to which phase section out of n possible phase sections of the transmitted signals the phase of the received signal belongs at the sampling instants. It also involves a calculation to form the component which is in phase or shifted through 90°, of a signal derived form the received signal by means of a phase shift to make its phase equal, at the sampling instants, to the center phase of the detected phase section.

U.S. Pat. No. 4,335,825 also describes a clock extractor in which an input data signal is sampled and held in accordance with a sampling frequency. A difference in voltage is detected between those portions of a waveform obtained which appear before and after a time when the waveform has a maximum voltage amplitude. A phase of that portion of the waveform which has the maximum amplitude, is determined by making the above-mentioned difference equal to zero, and a clock signal synchronized with the portion having the maximum voltage amplitude is extracted and reproduced from the input data signal.

However, both preceeding patents involves complex processing of the received clock and moreover, these systems do not process inevitable erroneous transitions occurring in real received data flow. U.S. Pat. No. 3,851,101 describes an adaptive phase synchronizer for syncronizing the phase of received digital data with the phase of a local clock. This system includes means for taking multiple samples of each bit of the received data, modulo 2 adders and up-down counters for locating the transitions in the data bits, and phase correcting means responsive to said transitions for adjusting the phase of the data over a range in excess of one bit intervals in accordance with the locations of the transitions in the received data relative to the local pulses. The system also includes a sampling register having a number of stages and a phase synchronizing circuit having more stages than that of the sampling register. Predetermined ones of the stages of the phase synchronizing register are selected depending upon the initial location of the transition in the sampling register. The stages are selected such that the transition occurs near the center of the group of stages selected. However, even if this system includes means for ignoring erroneous transitions (more than one per bit), it is complex and involves multiple samples of each bit.

SUMMARY OF THE INVENTION

Therefore, it is an object of the invention to provide a low cost and easy to integrate device for instructing the sampling circuitry to sample the incoming bits of multilevel digital signal at optimal times.

It is an other object of the invention to provide a low cost device for generating the sampling clock at the "middle" of the eye pattern, particularly for the use of bipolar codes, such as HDBn bipolar codes.

It is a further object of the invention to provide a device for deriving timing information by predictive determination of the time where the eye is open widest.

It is an other object of the invention to provide a predictive clock recovery circuit having predictive and adaptive sampling time determination means designed with non expensive logic components.

In order to attain the above objects, there is provided a clock extracting circuit which has means for determining the duration between two consecutive transitions of a multilevel digital signal, and means for generating a pulse SPL pulse at half third said duration after a the transition following on two consecutive previous transitions. A phase locked oscillator driven by said SPL pulse generates the extracted clock signal, in phase with the SPL pulse and which coincides with the center of the eye intervals of said multilevel digital signal.

In accordance with a preferred embodiment of the invention, a first counter N starts running in response to the detection of the first transition. The running stops when the second transition occurs, the result N(i) stored into the first counter N at second transition is therefore representative of the duration between the two consecutive first and second transitions. A divide by 2 circuit divides the result N(i) stored into the first counter at second transition. The preferred embodiment of the invention also involves an up/down counter which generates a second count K that is expected to be representative of half the value of the first counter N(i). This second counter K is used to generate the extracted clock in phase with the middle of the eye intervals. Counter K is adaptively updated by incrementing its current value K(i) by a fixed factor or, on the contrary, by decrementing its current value K(i) by a fixed damping factor. A comparator comparing K(i) and N(i)/2 controls the update of the current value K(i) according to the following rules: if the value K(i) is superior to N(i)/2 at the second transition, then the counter K is updated by decrementing its current value. Conversely, when K(i) is inferior to N(i)/2, then counter K is updated by incrementing its current value. In this way, the extracted clock which will be derived from counter K varies slowly and integrates sudden variations of the content of the first counter N. A counter P initialized with the updated value K(i+1) of counter K starts running from K(i+1) to zero in response to the detection of the transition following on two said first and second transition and delivers an SPL pulse whenever its content reaches the value zero. The phase locked oscillator controlled by the pulse SPL generates the extracted clock which is likely to coincide with the middle of the eye pattern.

BRIEF DESCRIPTION OF THE DRAWINGS

FIGS. 6, 7, 8A, 8B, 9A, 9B and 10 are different timing diagrams illustrating the running of the preferred embodiment of the invention.

FIGS. 11A, 11B, 11C and 11D illustrates the implementation of block 116 allowing the management of erroneous values of N counter.

DESCRIPTION OF THE INVENTION

Figure 2:
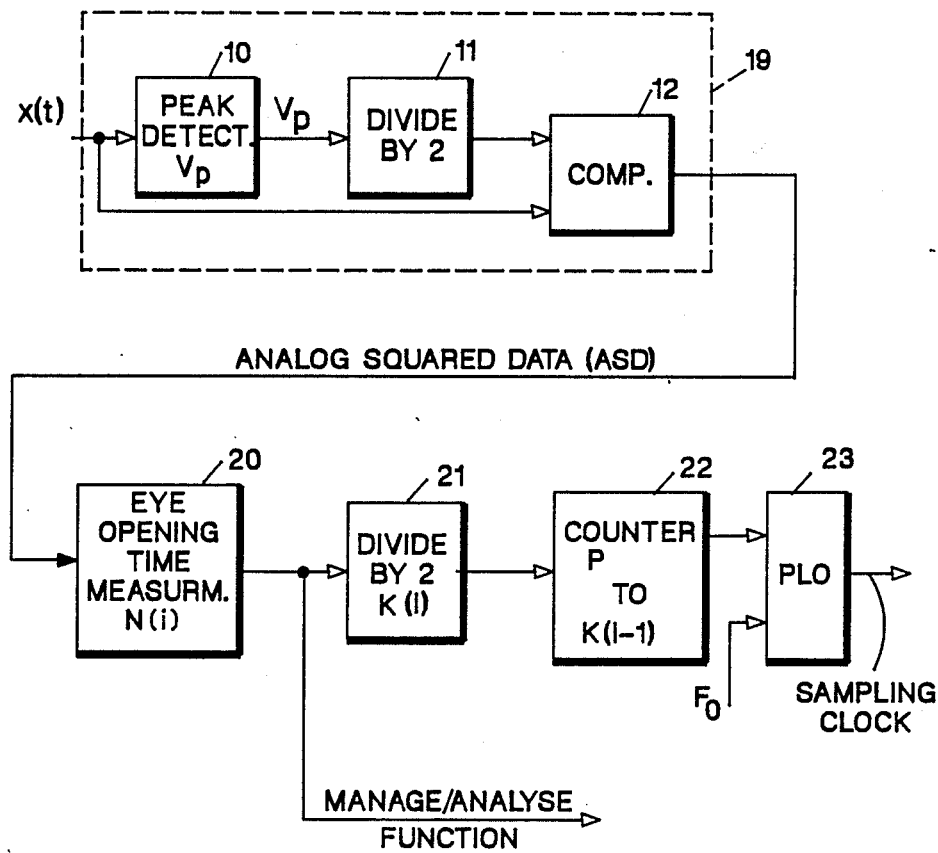
FIG. 2 describes the broad principle of the invention.

In order to avoid the above drawbacks of conventional clock recovery circuits having non automatic adaptivity of the sampling time determination, the invention substitutes said fixed delay by an auto adaptive delay. FIG. 2 illustrates the basic concept underlying the invention. The measure of the eye opening time N(i) is performed by block 20. This is achieved by means of a counter N controlled by the analog squared data (ASD) signal derived from the data flow on the line. The result of the counter N(i) is divided by 2 by means of block 21 to determine the best sampling time. This sampling time is determined by means of a other counter P in block 22 that will generate a pulse in the middle of the eye. This pulse drives the phase lock oscillator (PLO) 23 to generate a sampling clock in phase with the middle of the eye of the analog squared wave signal.

The ASD is generated by Analog Square generator 19 which includes circuit arrangements 10, 11 and 12.

The circuit arrangements and operations have been previously described and said description is incorporated herein by reference.

Figure 3:
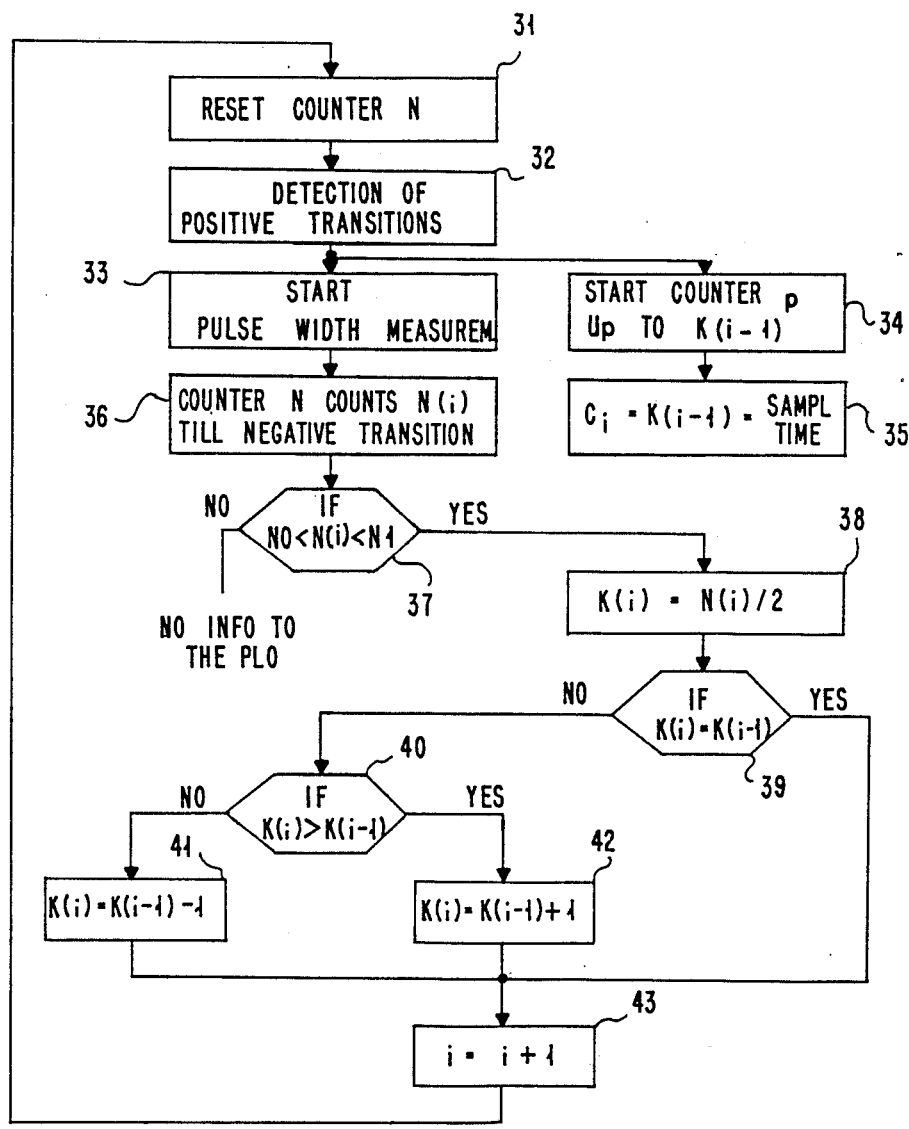
FIG. 3 describes a flow chart detailing the different and basic steps involved in the principle of the invention.

With respect to FIG. 3, the basic steps involved by the invention will now be described. As mentioned previously with respect to block 20 in FIG. 2, a adaptive delay is provided by means of a counter N. This counter N is reset after every negative transition of ASD signal, step 31. Then, step 32, the system detects the next positive transition of ASD signal. From now, counter N starts running to detect the width of the pulse of the ASD signal, step 33. This is achieved by detecting, step 36, the time at which ASD signal falls down. At this instant, the value of N counter is stored and called N(i) and then analysed, step 37. Indeed, to avoid taking into account erroneous values of N(i), a test is performed to detect whether N(i) is superior to a given threshold value N0 and inferior to a other given value N1. If the N(i) is comprised outside of (N0,N1), then the calculated value N(i) is recognised as being most likely an erroneous value and is not taken into account. On the contrary, if the value of N(i) is comprised within the two threshold N0 and N1, the processing progresses to step 38 which is the calculation of the adaptive value K(i). This new value will be used for the determination of the sampling time at the next positive transition of ASD signal.

The previously calculated value K(i−1) has been used before the negative transition of ASD signal to generate the sampling clock. Indeed, from the detection of the positive transition of ASD signal, step 32, counter P starts running, step 34. As soon as, counter P reaches the value K(i−1), a pulse is generated to the phase locked oscillator to generate the sampling process of the data.

After the updated value K(i) has been determined step 38, a comparison between K(i) and K(i−1) is performed step 39. If both values are equal, the system progresses to step 43 in which i is incremented and which is preceeding a new processing. If both values differ from each other, a test is performed to determined whether K(i) is higher or lower than K(i−1). In the first case, the system progresses to step 42 in which K(i) is eventually updated according to the following relation:

$$K(i)=K(i-1)+1.$$

In the second case, the system progresses to step 41 in which K(i) is eventually updated according to the following relation:

$$K(i)=K(i-1)-1.$$

By this way, the effects of impulse noise are avoided and the content of K(i) varies slowly.

Figure 4:
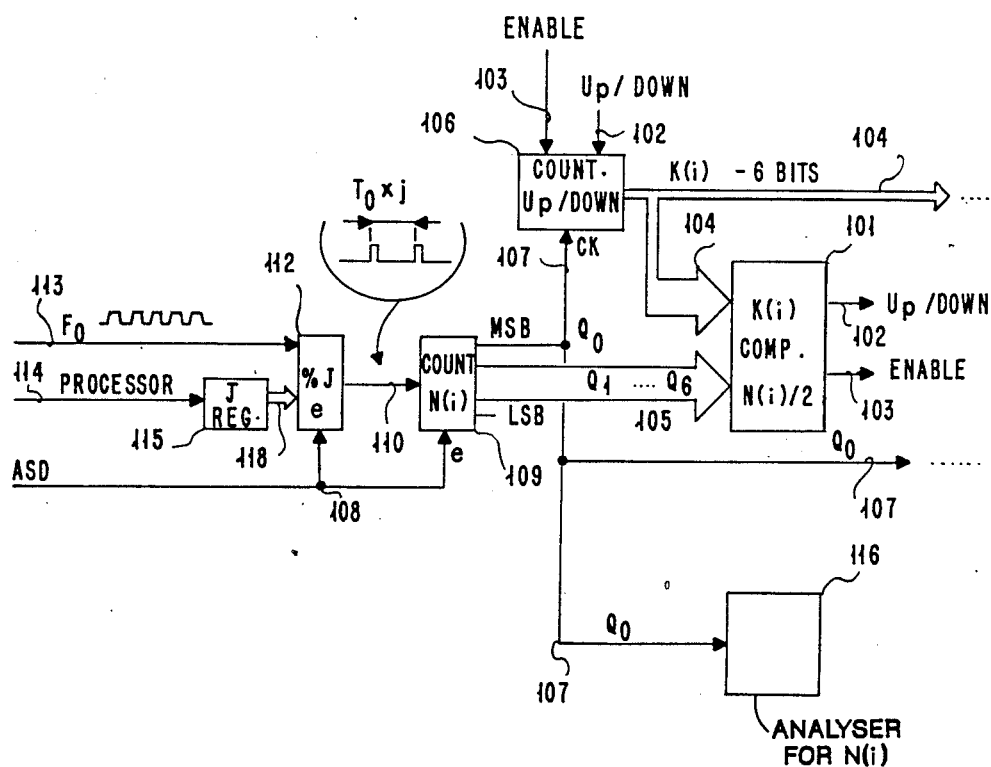
FIGS. 4 and 5 illustrates the preferred embodiment according to the invention.
Figure 5:
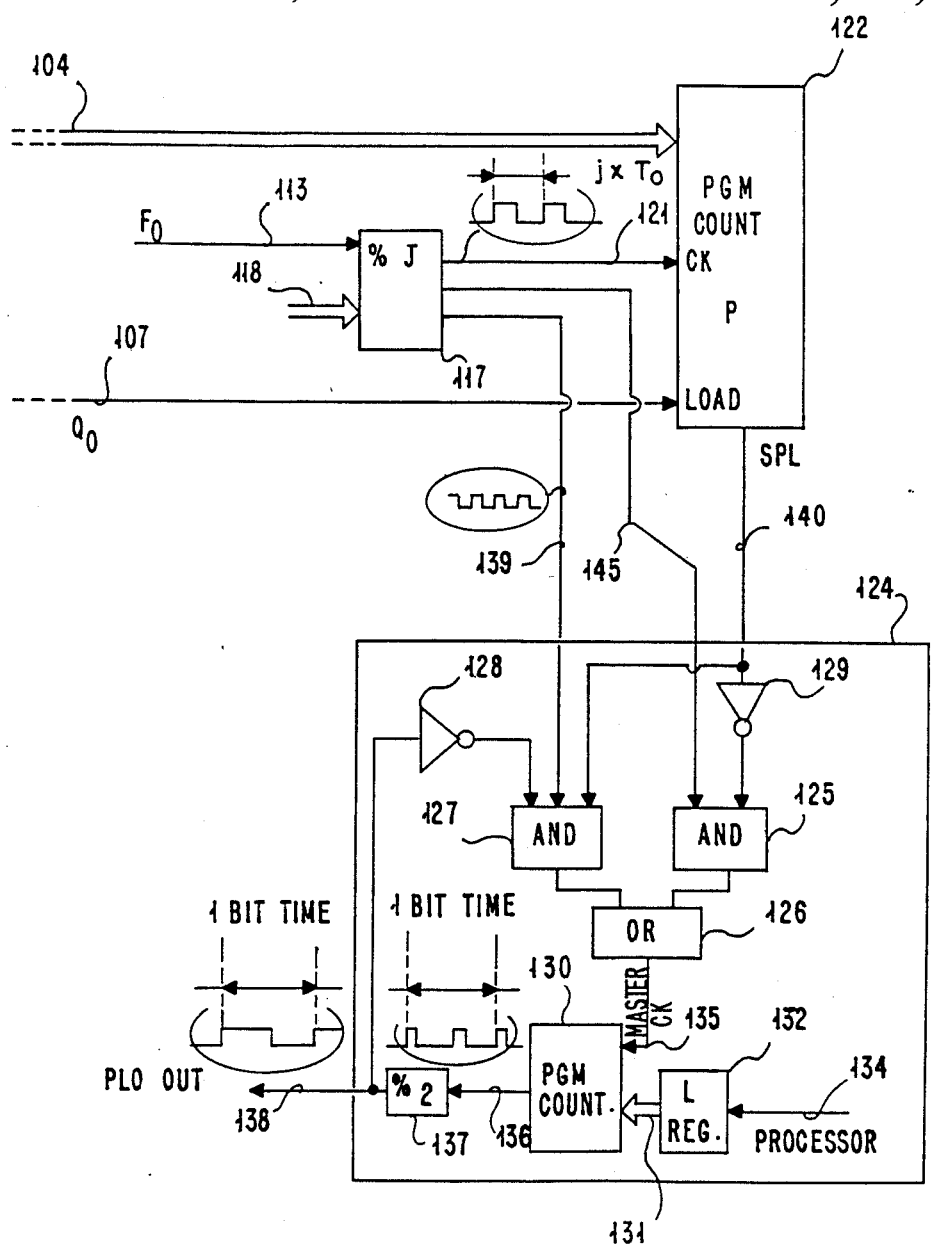
Figure 6:
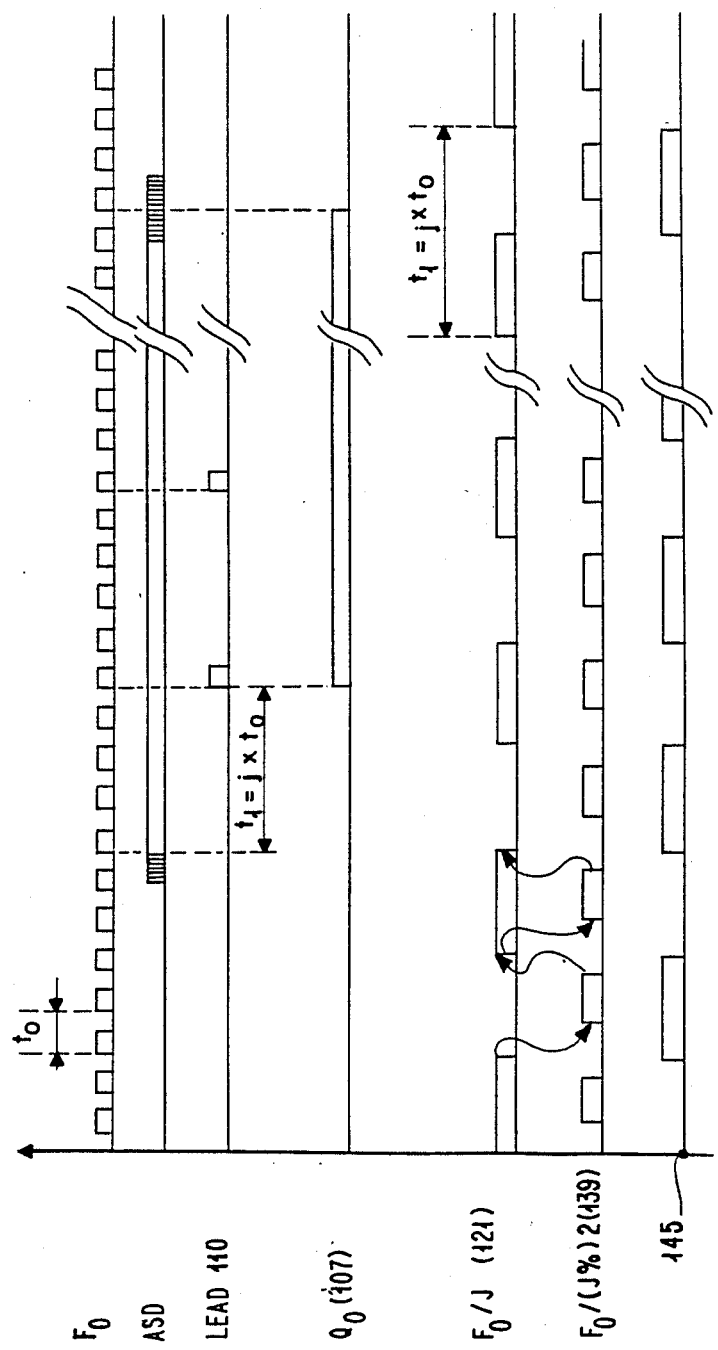

A preferred exemplary embodiment of the clock recovery circuit is illustrated in FIGS. 4 and 5 which must be associated to illustrate the whole system as indicated in FIG. 4. The preferred embodiment of the clock recovery circuit operates for receiving a pulse stream on ASD line 108. This signal existing on line 108 is used to control a divide by J circuit 112. The latter is a programmable divider, the value of the division being stored into a register called J register 115. The value stored into J register 115 may easily be changed according to requirements by means of a external processor. Divide by J circuit 112 is driven by a clock, the value of the frequency being fo. The value fo of is determined by considering all needed speeds of the clock recovery circuit as will be explained hereinafter. The enable (e) input of divide by J circuit 112 is receiving ASD signal existing on lead 108 and controls circuit 112 as follows:

When ASD signal is at a low level, divide by J circuit 112 is stuck at a waiting state. Whenever ASD signal existing on lead 108 raises, circuit 112 begins to count and generates a pulse every J pulses of the clock existing on lead 113. Since divide by J circuit 112 is reset as soon as ASD signal falls down, all glitches lasting less than jxTo ( To being equal to 1/of) are eliminated. Therefore divide by J circuit 112 delivers its first pulse at time jxTo after the raising of ASD signal lasting at least jxTo. Similarly all glitches existing before ASD signal falls down are not taken into account since the first one is enough to reset divide by J circuit 112. The timing of signals Of, ASD and the output signal of divide by J circuit existing on lead 110 are illustrated in FIG. 6. With respect to FIG. 4 now, The pulse train existing on lead 110 is used to drive an 8-bit-counter 109 which is in charge of determining the value of N(i) according to the flow chart of FIG. 3. The output of counter N(i) circuit 109 is a byte Q0-Q1-Q2-Q3-Q4-Q5-Q6-Q7, . Q0 corresponds to the most significant bit (MSB) and Q7 is the less significant bit (LSB). The seven less significant bits Q1-Q7 carry the value of the counter N. Similarly to what is preceeding, counter N(i) circuit has an ENABLE input receiving ASD signal existing on lead 108. Therefore when ASD signal is in a low state, counter N(i) circuit is blocked in a initialization state and the counting process is authorized only when ASD signal raises. The initialization state of N(i) counter 109 is characterized in the fact that the value loaded is '7F' in hexadecimal, which stands for 01111111 (Q0 being equal to 0 and all other bits being equal to 1). Consequently, as soon as the first pulse appears on lead 110, the output of N(i) counter 109 becomes 1000000 and therefore Q0 bit raises to high level according to the timing chart illustrated in FIG. 3. Q0 on lead 107 will fall down to low level only when ASD signal becomes low. The remainder bits Q1-Q2 . . . Q7 consists in a 7-bit-word carrying the value of the number of pulses appearing on lead 110 while a high state of ASD signal. According to step 38 of FIG. 3, the division of N(i) is performed by eliminating the less significant bit Q7/2 and the remainder 6-bit-word consisting of Q1-Q2- . . . Q6 is transmitted through a 6-bit-bus 105 to a first input of a comparator 101. A second 6-bit-bus 104 carries the value of K(i) to a second input of the latter comparator so that to perform the comparison of step 40 in FIG. 3. Comparator 101 has an output lead "UP/DOWN" 102 and an output lead "enable" 103 which comply with the following rule:

When both inputs 104 and 105 of comparator 101 are equal, "enable" output 103 is at a low level. When inputs 104 and 105 differ, "enable" output 103 is at a high level. Output "up/down" 102 is relevant only when "enable" output 103 is at a high level, that is to say when inputs of comparator 101 are different. When N(i)/2 is higher than K(i), "up/down" lead 102 is high and conversely when N(i)/2 is lower than K(i), lead 102 is at a low state.

Both "up/down" and "enable" leads of comparator 101 are used to control a "up/down" counter 106 which operates as follows:

When lead 107 carrying the MSB of the result N(i) falls down, "up/down" counter 106 calculates the new value K(i+1) function to the previous value K(i) and both leads 102 and 103: If "enable" lead 103 is low, "up/down" counter performs K(i+1)=k(i) since both inputs 104 and 105 of comparator 101 are equal.

If "enable" lead 103 is high and "up/down" lead 102 is UP (high state), "up/down" counter 106 performs the operation K(i+1)=K(i)+1. This operation is the counterpart of step 42 in FIG. 3.

If "enable" lead 103 is high and "up/down" lead 102 is DOWN (low state), "up/down" counter 106 performs the operation K(i+1)=K(i)−1. Similarly, This operation is the counterpart of step 41 in FIG. 3.

Therefore, "up/down" counter 106 continuously updates the value K(i) which will be used to calculate the adaptive sampling time. Since only one-unity-changes are allowed in the value of K(i) at each pulse of lead 107, the effects of existing glitches and abnormal values of N(i) due to a bad transmission on the line, are suppressed.

Figure 7:
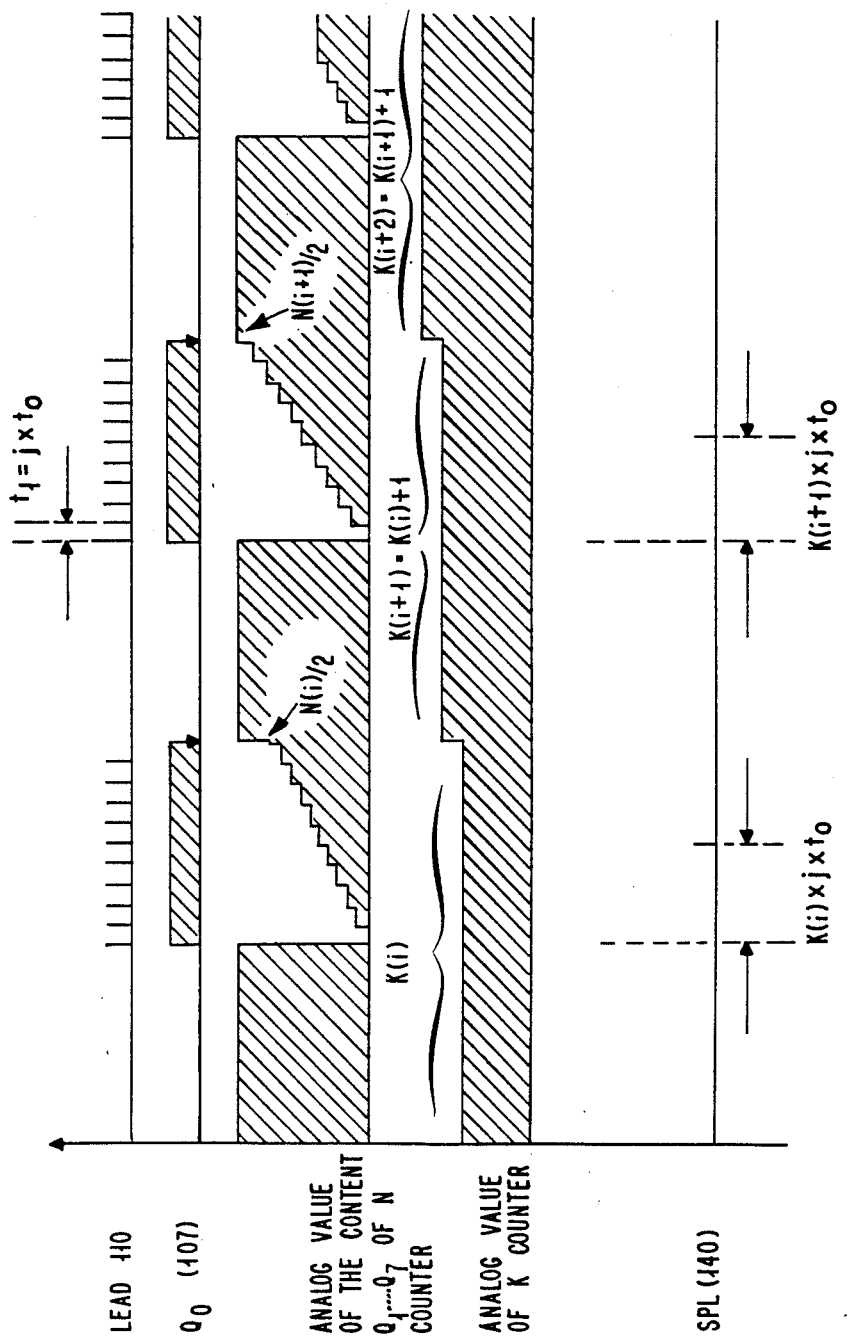

Timing diagrams illustrating signals existing on lead 110, Q0 signal and analog representations of N(t) and K(t) are shown in FIG. 7. As seen previously, all operations affecting the value of K(i) are performed at every negative transition of pulse Q0. Therefore the relation between N(t), K(t) and N(i) and K(i) is the following: N(i) is a sequence build from N(t) when t coincides with a negative transition of Q0. Similarly, K(i) is a sequence build from K(t) when t coincides with a negative transition of Q0.

Since N(i) counter 109 generates the binary value of N(i) on the 7-bit-word Q1-Q2- . . . Q7, and a pulse-width-representation of N(i) on lead 107 carrying the value of Q0, it may become advantageous to analyse N(i) according to step 37 in FIG. 3. By this way, it is possible to detect the presence of erroneous glitches characterized by a value N(i) inferior to a first threshold N0 or superior to a second threshold N1. Therefore it becomes possible to count and manage abnormal events for statistical purposes or in order to take specific actions, such as alerting the operator, transmitting a special message to the host system . . . In the preferred embodiment of the invention, block 116 is particularly connected to lead 107 as described below. This block is designed to count and suppress erroneous values of N(i) as will be described hereinafter.

With respect to FIG. 5, the 6-bit-bus 104 carrying the value of K(i) and lead 107 are used to control a programmable counter 122 in order to generate a pulse in the middle of the eye of the received signal. Programmable counter 122 operates as follows:

As long as Q0 signal transmitted to "load" input of programmable counter 122, stays at a low state, the value of K(i) existing on bus 104 remains loaded into it. When Q0 signal raises, programmable counter 122 counts from K(i) to 0 at each pulse of the clock existing in its CK input. As soon as programmable counter 122 reaches the value 0, its SPL output generates a pulse having a width being equal to jxTo. The CK input of programmable counter 122 is connected to lead 121 which is the output of divide by J circuit 117. This circuit is similar to divide by J circuit 112 in that it provides to CK input of programmable counter 122 a square wave signal having a period time equal to jxTo. However, contrary to the signal existing on lead 110, the signal existing on lead 121 is free-running, that is to say exists independently to the state of ASD signal. Divide by J circuit 117 is driven by the same clock that drives divide by J circuit 112 on lead 113. The value of the parameter J of the division is stored into J register 115 that is connected to divided by J circuit 112 and connected to divide by J circuit 117 by means of a bus 118. Divide by J circuit 117 is also used to provide another signal on lead 139 having a frequency which doubles the frequency of the signal on lead 121. Therefore, the signal on lead 139 has a frequency Fo/(j/2). Both signals existing on leads 121 and 139 are illustrated in FIG. 6.

Signals existing on leads 139, 121 and SPL signal existing on lead 140 are transmitted to a block 124 which is designed to generate the recovered clock having transitions in the middle of the eye of the received stream of data and which will be used to control the sampling process. Block 124 includes a programmable counter 130 connected to a L register 132 by means of a bus 131. L register 132 may be addressed by external means such as the processor previously mentioned. The purpose of programmable counter 130 is to generate a pulse train on lead 136 that will provide the right bit frequency Fb after a divide by 2 circuit 137, said pulse train being locked in phase on SPL signal. The feedback loop which allows the regulation of the phase of the signal Fb includes an inverter 128 which is able to block AND gate 127. AND gate 127 has also a second and third input connected to lead 139 and lead 140 carrying SPL signal. Block 124 also includes an AND gate 125 receiving the complement signal of SPL from inverter 129. AND gate 125 has a second input connected to lead 145 carrying the square waved signal having period time of jxTo and having a phase opposite to that of the signal existing on lead 121. Both outputs of AND gates 125 and 127 are connected to an OR gate 126, the output of which is providing a so-called master clock to programmable counter 130.

Block 124 provides by means of clock signal on leads 121 and 139 and SPL signal, the recovered clock Fb that will be used to determine the adequate sampling time. PLO out clock is a clock having a phase controlled by SPL and a frequency Fb generated from fo clock on lead 113 by means of successive divisions. The relation between of and fb is the following:

$$fb = \frac{fo}{j \times l \times 2}$$

This relation is due to the successive processing of fo signal on lead 113 by programmable counter 122 and programmable counter 130. Therefore, the adjustment of the term jx1 allows a wide range of speeds on the transmission line with a single clock fo. As will be mentioned hereinafter, the adjustment of the term j allows to control the value of the elementary jitter of the clock recovery circuit.

Circuit 124 operates as follows:

With respect to FIGS. 8A and 8B, let us assume that the square waved signal on lead 138 is in advance respective to SPL signal. Because of inverter 129, the output of AND gate 125 is always set to a low level when SPL signal is low. Therefore, the output of AND gate 125 delivers a pulse train as long as SPL signal is low, each pulse being distant of jxTo. Since SPL pulse is also jxTo long, the output of AND gate 125 delivers a constant pulse train with only one pulse missing. Because of this feature, and assuming that AND gate 127 is inactive, master clock on lead 135 has a frequency slightly slower than that of the free-running clock having a period time of jxTo and existing on lead 121. Therefore, the train pulse delivered by programmable counter 130 and then divided by divide by 2 circuit, is constantly delayed.

To permit the above delay be made up, AND gate 127 has been introduced. Indeed, the latter gate is able to generate two single pulses delayed of jxTo/2 and that only when SPL pulse is high, i.e. when the output of AND gate 125 remains silent. The condition for generating these two extra pulses is determined by inverter 128: the two extra pulses are generated when PLO out on lead 138 is low that is to say when the recovered clock is running late. These extra pulses will entail the generation of the next pulse on the output of programmable counter 130 on lead 136 to be performed slightly earlier and allow the clock recovery system to make up progressively his delay. FIGS. 9A and 9B detail the timing diagrams of SPL, of the signals on lead 121, 139, of the output of AND gates 125 and 127 and other above mentioned signals.

Because of AND gate 127, master clock on lead 135 may present two extra pulses when the clock recovery system is running late with respect to the situation in which the recovered clock is early. However, the difference between the master clock in one of the preceeding situation and the master clock when the recovered clock is in accurate synchronism with SPL is only one pulse. An example of this situation is illustrated in FIG. 10. In this case, at time t1, SPL signal raises. Since the PLO out signal is still low, AND gate 127 will transmit the positive transition on lead 139 that will occur at time t2. This positive transition is transmitted to programmable counter 130 by OR gate 126 which eventually generates a positive pulse on lead 136 and consequently on lead 138. Immediately, the output of inverter 128 falls down and stuck AND gate 127. Therefore, the master clock on lead 135 has only transmitted one pulse to switch the output of the counter 130. Thus, a constant pulse train has appeared on lead 134 with only a one-pulse-difference with respect to the case when the synchronism is not fairly achieved, such as in FIGS. 8A, 8B, 9A and 9B.

As a conclusion, the elementary jitter is determined by the value of jxTo and may be adjusted simply by changing the value of the parameter j. This is simply done by updating the content of J registers 115 and 119 by means of the said external means such as a processor. Thus, the processor addressing the latter register may control the value of the jitter according to the requirements of the user. For instance, the processor may store a high value of j, thus entailing a quick but coarse regulation of the sampling time, when the clock recovery system is not yet locked to the middle of the eye. This situation is detected by the processor when the value of K(i) is constantly increasing. However, whenever the clock recovery circuit of the invention is approximately locked to the middle of the eye, the processor may change the value of j, thus allowing a slower but much more precise control of the sampling time.

As seen previously, the processor may change the elementary jitter 1/j, without modifying the bit frequency of the transmission simply by keeping the product Lxj constant. That is achieved by addressing register L 132.

With respect to FIG. 4, block 116 was said to be able to perform the management of the transmission by analysing the value of N(i) measured by counter 109. This is described in detail with respect to FIGS. 11A, 11B, 11C and 11D.

Figure 11A:
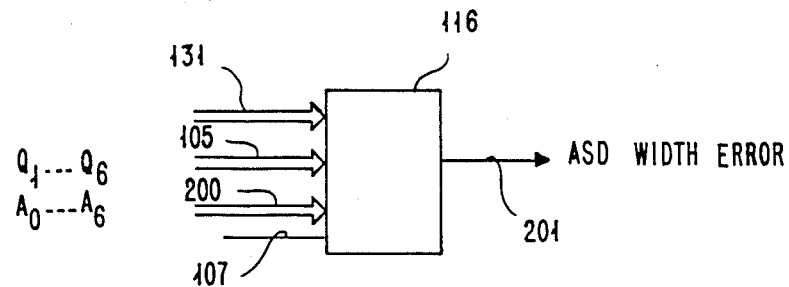

With respect with FIG. 11A there is described all needed signals to elaborate signal 201 indicating the appearance of an erroneous ASD pulse. Block 116 is designed to compare N(i) existing on bus 105 with a minimum threshold and a maximum threshold carried on busses 131 and 200. Bus 131 is the output of L register 132 described above with respect to FIG. 5. Signal Q0 on lead 107 is also used by block 116.

Figure 11B:
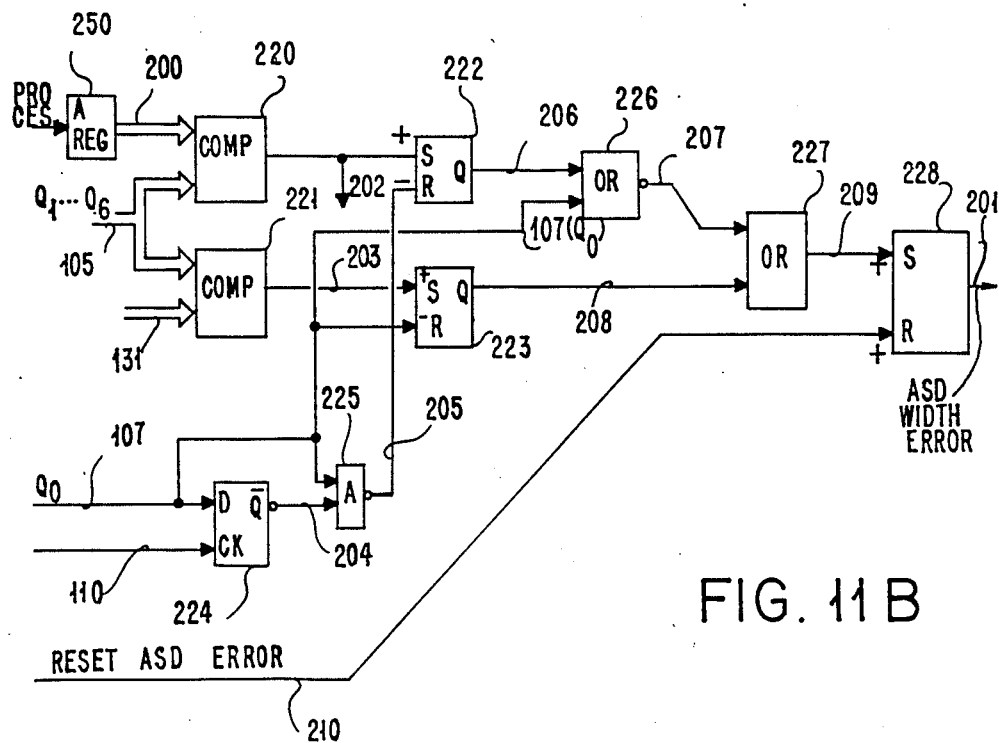

With respect with figure 11B, block 116 includes two comparators 220 and 221, both having a first input connected to bus 105 carrying Q1 .. Q6. The second input of comparator 220 is connected to a bus 200 which carries a value A1... A6 stored into a register 250. This 6-bits word corresponds to the minimum value of ASD width under which an error signal on lead 201 will be generated. A register stores the value N0 with respect to step 37 in FIG. 3. Comparator 221 has its second input connected to bus 131 carrying the value L loaded into L register 132. This value L corresponds to the maximum allowed length of ASD signal. Therefore, the output of counter N 109, i.e. the word Q1 . . . Q6 is compared with the value stored into A register 250 and the value of L register 132.

When the value of N counter reaches the value of A1–A6, a pulse is appearing at the output of comparator 220 on lead 202, as illustrated in figure 11D. This pulse is transmitted to "Set" input of latch 222. The output of latch 222 is connected to an NOR gate 226 which has an output lead 207. NOR gate 226 has an other input connected to lead 107 carrying the value of Q0. Therefore, when the value of N reaches A1 . . . A6, the output of NOR gate 226 generates a pulse on lead 207 when Q0 falls and if lead 206 is at a low level. Latch 222 has a "Reset" input which reacts at a low voltage level and which is connected to the output lead 205 of NAND gate 225. This latter receives signals Q0 on lead 107 and also, signal on lead 204 generated by a D latch 224 having its D input connected to lead 107 and a clock input connected to lead 110. Thus, latch 222 is resetted when signal Q0 appears and in synchronism with signal on lead 110 generated by divide by J circuit 112.

Similarly, when the values of N counter 112 and L are equal, comparator 221 generates a pulse on lead 203 that is transmitted to the "set" input of a latch 223. The "set" input of latch 223 is sensitive to a high voltage level as illustrated in figure 11B. Latch 223 is resetted when Q0 signal falls down since lead 107 is connected to its low-level-sensitive-"reset" input. The output of latch 223 is connected to lead 208 which transmits the error signal to OR gate 227, the output 209 of which is connected to a latch 228 that stores the final ASD width error detection signal. This signal is transmitted by lead 201 to external means, such as a processor, for taking a particular course of action (alarm signal, storage for statistical purpose ... ). This latter latch may be resetted by lead 210, when the error situation has been acknowledged by the external processor.

Figure 11C:
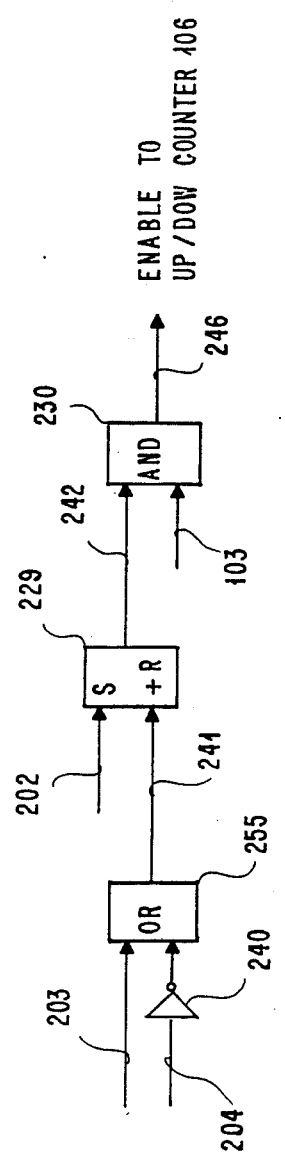

With respect to FIG. 11C, signals existing on leads 202, 203 and 204 are used to prevent bad values of N(i), i.e. not comprised into the range (N0, N1), to be considered into the adaptive calculation of the "middle of the eye". Indeed, A latch 229 may be set by a positive pulse on lead 202 and resetted by a positive pulse coming from the output of an OR gate 255 and transmitted on lead 241. OR gate 255 has a first input connected to lead 203 and a second input connected to the output of an inverter 240, which provides the complement signal of that existing on lead 204. This output of latch 229 is connected to AND gate 230 having a second input controlled by "enable" signal on lead 103 and provided by comparator 101. The output of AND gate 230 is transmitted on lead 246 to the "enable" input of up/down counter 106. Thus, lead 246 supersedes previous lead 103 mentioned with respect to FIG. 4. Therefore, the update of K counter is allowed only when the value of N(i) is acknowledged to be correct and the effects of the occurrence of erroneous eye patterns are suppressed. The timings summarizing the operations involved into analysing block 116 are illustrated in FIG. 11D.

Figure 1A:
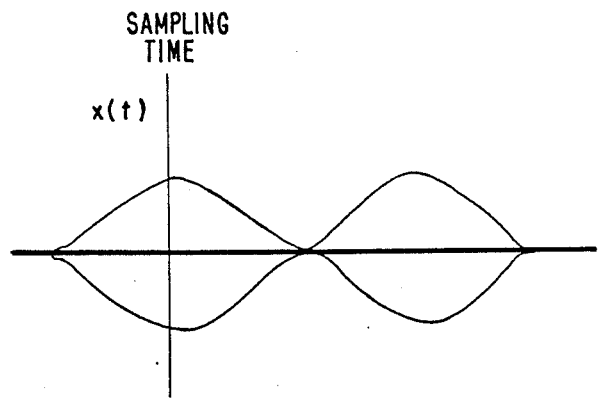
FIGS. 1A and 1B describe typical examples of eye patterns.
Figure 1B:
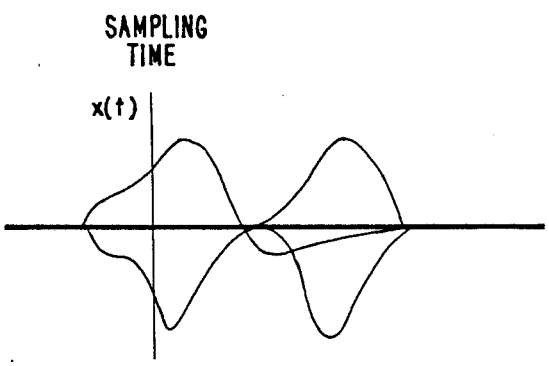
Figure 1C:
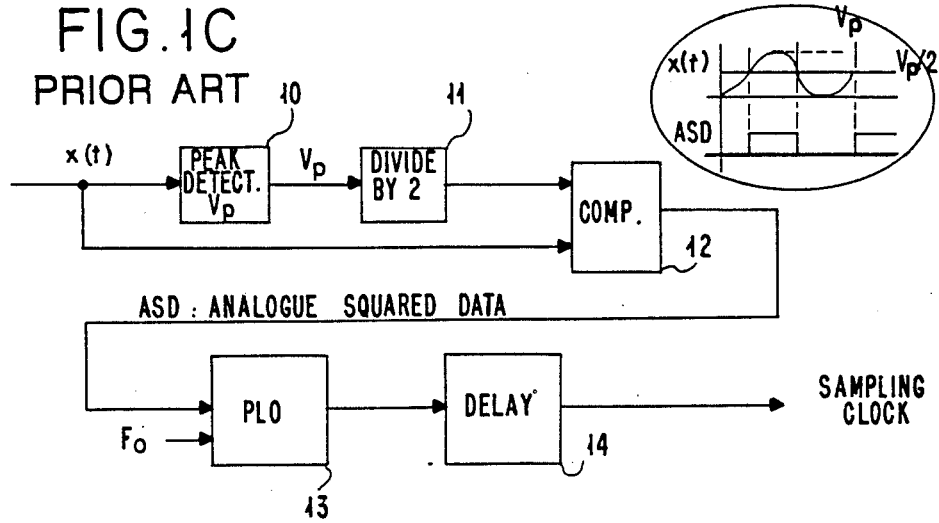
FIG. 1C describes the conventional way of generating the sampling clocks derived from the data flow.
Figure 12:
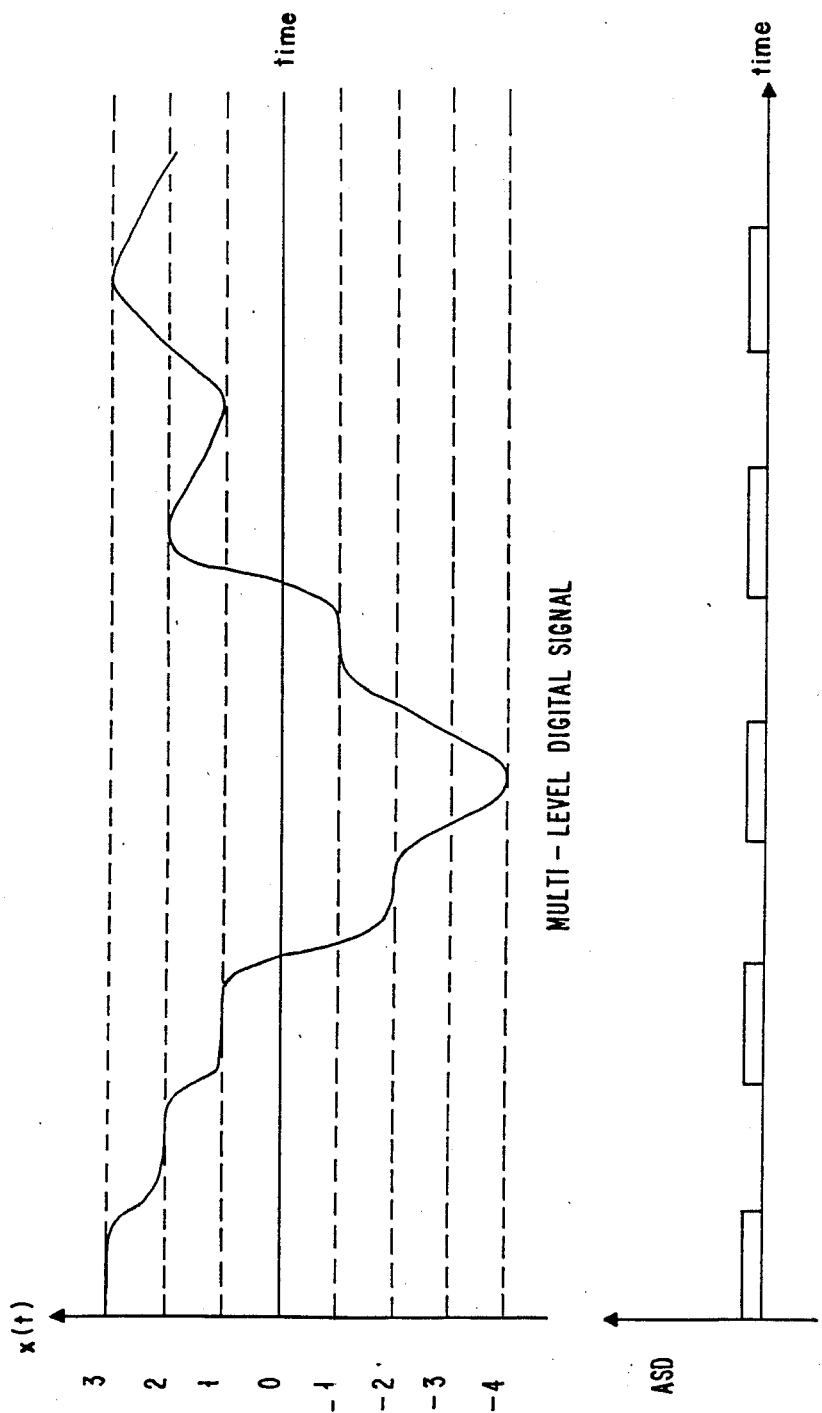
FIG. 12 is an illustration of the adaptation of the invention to a multilevel digital signal.

As previously mentioned, the preferred embodiment of the invention involves the transmission of data on the communication channel according to a binary coding format, such as HDBn, but it should be noticed that the clock recovery system of the invention may be used for recovering a clock signal from multilevel digital signals. For example, in a eight level band-limited digital signal, blocks 10, 11 and and 12 of FIG. 1C are superseded by a group of thresholds to detect the threshold crossings of x(t), that is to say the slicing or passing thruogh of a threshold level by x(t) as it varies in magnitude from logic level to another logic level. From this detection, signal ASD with only two levels will be derived. Signal ASD has transitions in phase with the thresholds crossing of x(t) and is used to control the sampling time according to what is preceeding. FIG. 12 illustrates a timing diagram of a eight-level digital signal x(t) and its corresponding ASD signal that will drive the predictive clock recovery system according to the invention. This one will derive from ASD clock a adaptive sampling time that will occur at optimal times.

I claim:

1. A circuit arrangement for extracting a clock signal from a multi-level digital signal comprising:
    a first means for monitoring the multi-level digital signal and for detecting transitions within said multi-level digital signal;
    a second means responsive to a first and second consecutive detected transitions, for generating a first count N(i) representative of a time duration between said first and said second consecutive detected transitions;
    a third means coupled to the second means, said third means receiving the count N(i) and generating a second count (N(i)/n, with n being an integer;
    a fourth means coupled to the second means; said fourth means being operable for generating a third count K(i) representative of one-half time durtion between a third and a fourth consecutive detected transitions;
    a fifth means having a first set of inputs for receiving the count N(i)/n and a second set of inputs for receiving the count K(i); said fifth means being operable for analyzing N(i)/n and K(i) and outputting control signals which are received in the fourth means to selectively adjust K(i); and
    a sixth means coupled to the fourth means; said sixth means having a set of inputs for receiving output signals representative of a count from said fourth means and generating a SPL pulse when said count is decremented to a predetermined value thereby indicating that the SPL pulse is positioned at the center of the eye intervals of the multi-level digital signal.

2. The circuit arrangement of claim 1 further including:
    a phase locked oscillator (124) responsive to the SPL pulse and for generating said extracted clock signal in phase with said SPL pulse so that said extracted clock signal coincides with the center of eye intervals of the multi-level digital signal.

3. A circuit arrangement according to claim 2 and characterized in that said phase locked oscualtor includes:
    an OR gate (126) having a first input connected to the output of a first AND gate (127) and a second input connected to the output of a second AND gate (125), said first AND gate (127) being driven by a first clock signal (139) and said second AND gate (125) being driven by a second clock signal (121) having a frequency half that of said first clock signal (139),
    a fourth counter (130) for generating a pulse every L pulses appearing at the output of said OR gate (126),
    means (128, 129) for enabling said first signal (139) to be transmitted to said OR gate (126) whenever the output of said fourth counter (130) has a phase being late relative to said SPL signal, and for substituting to said first signal (139), said second signal when the output of said fourth counter (130) has a phase in advance to that of said SPL signal, whereby allowing a regulation of the output of said fourth counter with respect to said SPL signal.

4. A circuit arrangement according to claim 3 characterized in that:
    said clocks that drive said second means and said sixth means P are derived from a single clock,
    said clock that drives said second means is derived from said single clock by a first divide by J circuit (112, 115),
    said clock that drives said sixth means is derived from said single clock by a second divide by J circuit (112, 119),
    said second clock signal (121) is generated by said second divide by J circuit (112, 119),
whereby the elementary step of the regulation of the output of said fourth counter is controlled by the value of the parameter J.

5. The circuit arrangement of claim 1 wherein the second means includes a first counter N which begins to count on the occurrence of the first detected transition and stop counting on the occurrence of the second consecutive detected transition.

6. The circuit arrangement of claim 1 wherein the fourth means includes an Up/Down counter which begins to count on the occurrence of the third consecutive detected transition, said Up/Down counter having means for decrementing said count K(i) by a fixed damping factor and having means for incrementing said count K(i) by a fixed factor.

7. A circuit arrangement according to claim 6 characterized in that it further includes:
    means (116) for analyzing said count N(i) of said second means to prevent the update of said up/down counter to be performed when said result N(i) is inferior to a first threshold N0 and superior to a second threshold N1, whereby erroneous values of N(i) are not taken into account.

8. A circuit arrangement according to claim 7 characterized in that said fixed damping factor and said fixed factor are equal to 1.

9. The circuit arrangement of claim 6 wherein the third means includes a divide circuit with n=2.

10. The circuit arrangement of claim 9 wherein the fifth means includes a comparator which compares $N(i)/2$ with $K(i)$ and if $K(i)$ is greater than $N(i)/2$, then said comparator initiates said decrementing means to subtract said fixed damping factor from previous value $K(i)$; if $K(i)$ is less than $N(i)/2$, the said comparator initiates said incrementing means to add said fixed factor to previous value $K(i)$.

11. The circuit arrangement of claim 1 wherein the sixth means includes a third counter P.

12. A method for extracting clock signals synchronized about the variable center of eye intervals of a multi-level digital signal comprising the steps of:
  (a) monitoring the multi-level digital signal to detect transitions therein;
  (b) generating a first count $N(i)$ representative of actual time duration occurring between two consecutive detected transitions;
  (c) generating a second count $N(i)/n$, with n being an integer;
  (d) predicting a third count $K(i)$ representative of the time duration occurring between a third and fourth consecutive detected transition;
  (e) comparing the counts in step (c) and step (d) and generating control signals which adjust the count in step (d) to provide an adjusted count $\Delta K(i)$ whose value represents one-half the actual time duration occurring between the third and the fourth consecutive detected transitions, only if the count of step (c) and step (d) differ;
  (f) using $\Delta K(i)$ to generate SPL pulses representing the variable center of eye intervals of said multi-level digital signals.

13. The method of claim 12 further including the step of synchronizing a free running clock about the SPL pulses to generate the extracted clock signal.

* * * * *